(12) United States Patent
Ren et al.

(10) Patent No.: US 10,827,831 B2
(45) Date of Patent: Nov. 10, 2020

(54) MULTIFUNCTIONAL HOLDER WITH A WIRELESS CHARGING MODULE

(71) Applicant: SHENZHEN VGOODE TECHNOLOGIES CO., LTD., Shenzhen (CN)

(72) Inventors: Huaide Ren, Anaheim, CA (US); Ying Zhang, Anaheim, CA (US); Yuan Huo, Anaheim, CA (US); Wentao Wang, Anaheim, CA (US)

(73) Assignee: SHENZHEN VGOODE TECHNOLOGIES CO., LTD., Shenzhen (CN)

( * ) Notice: Subject to any disclaimer, the term of this patent is extended or adjusted under 35 U.S.C. 154(b) by 106 days.

(21) Appl. No.: 16/033,490

(22) Filed: Jul. 12, 2018

(65) Prior Publication Data

US 2020/0015585 A1    Jan. 16, 2020

(51) Int. Cl.
*H02J 7/00* (2006.01)
*A47B 21/04* (2006.01)
*F16M 13/02* (2006.01)
*F21V 33/00* (2006.01)
*H02J 7/02* (2016.01)

(52) U.S. Cl.
CPC ............ *A47B 21/04* (2013.01); *F16M 13/022* (2013.01); *F21V 33/0012* (2013.01); *H02J 7/025* (2013.01); *F16M 2200/06* (2013.01)

(58) Field of Classification Search
CPC ................................. A47B 21/04; H02J 7/025
USPC ......................................................... 320/108
See application file for complete search history.

(56) References Cited

U.S. PATENT DOCUMENTS

| 8,843,178 | B1 * | 9/2014 | Wong ................. H04M 1/72527 |
| | | | 455/556.1 |
| 9,355,498 | B2 * | 5/2016 | Troy ....................... G06T 19/006 |
| 9,753,569 | B2 * | 9/2017 | Han ......................... G06F 3/033 |
| 9,890,899 | B2 * | 2/2018 | Theis ..................... F16M 11/041 |
| 2013/0113421 | A1 | 5/2013 | Han et al. |
| 2013/0200579 | A1 * | 8/2013 | Abernethy ................ B62B 3/02 |
| | | | 280/6.15 |
| 2013/0279106 | A1 * | 10/2013 | Ergun .................... G06F 1/1632 |
| | | | 361/679.26 |
| 2017/0009935 | A1 * | 1/2017 | Theis .................... F16M 11/041 |

FOREIGN PATENT DOCUMENTS

| CN | 202598051 U | 12/2012 |
| CN | 203825530 U | 9/2014 |
| CN | 204089251 U | 1/2015 |
| CN | 204883486 U | 12/2015 |
| CN | 106371516 A | 2/2017 |
| CN | 106532857 A | 3/2017 |
| CN | 106786905 A | 5/2017 |
| CN | 107221045 A | 9/2017 |
| CN | 107222033 A | 9/2017 |
| CN | 206802696 U | 12/2017 |
| CN | 107595526 A | 1/2018 |

* cited by examiner

*Primary Examiner* — Yalkew Fantu
(74) *Attorney, Agent, or Firm* — Anova Law Group, PLLC

(57) ABSTRACT

A multifunctional holder includes a fixation device configured to fix the multifunctional holder on another device, a support device fixed on the fixation device, and an adjustment device rotatably connected to the support device and configured to mount a display terminal. A position and an angle of the display terminal is controlled by a rotation and an adjustment of the adjustment device.

12 Claims, 1 Drawing Sheet

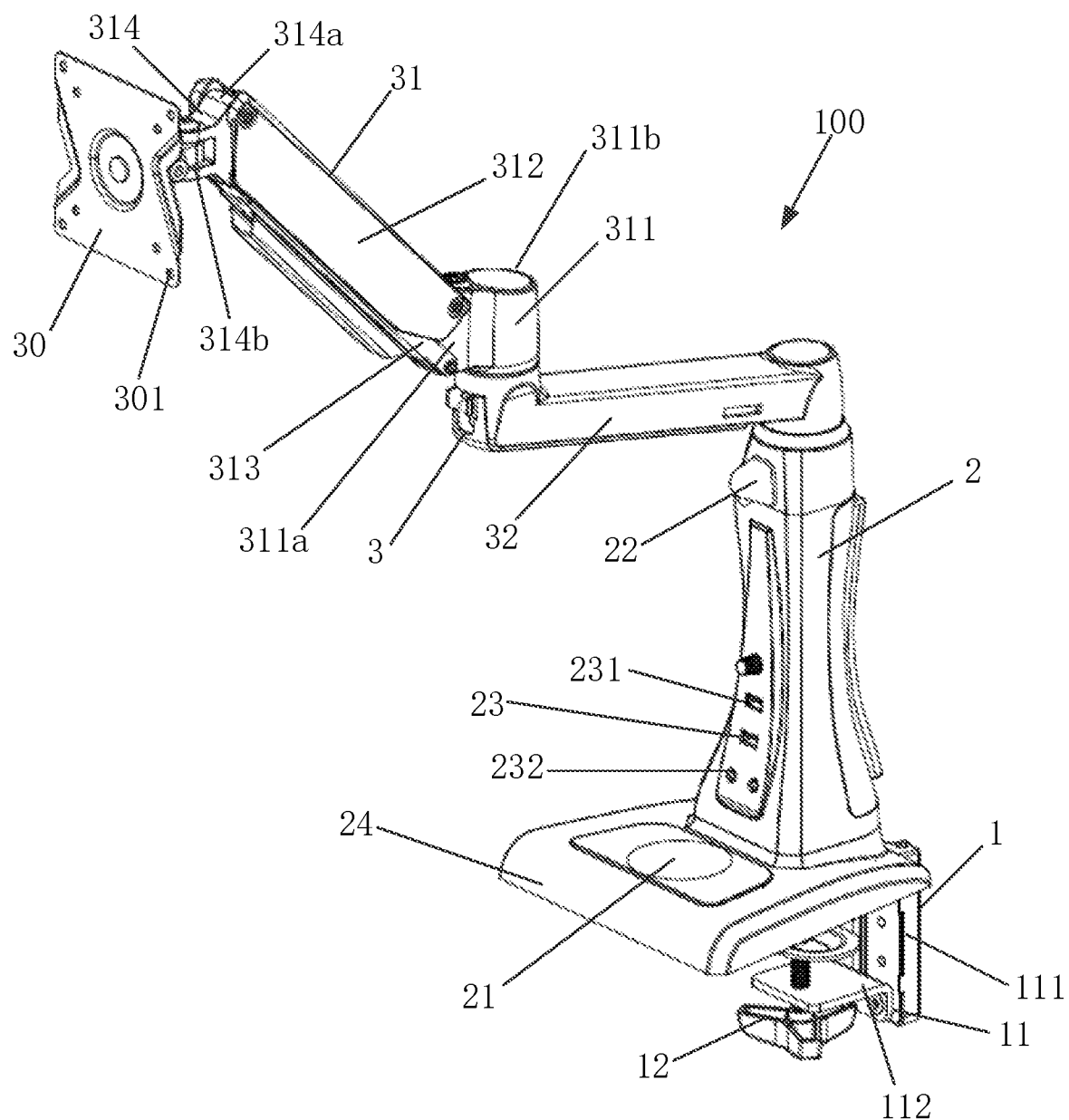

MULTIFUNCTIONAL HOLDER WITH A WIRELESS CHARGING MODULE

TECHNICAL FIELD

The present disclosure relates to the technical field of office equipment, and in particular to a multifunctional holder.

BACKGROUND

Computer display holders are applied more and more widely, and have been expanded from demands in, for example, offices and workshops to the ordinary families.

At present, various products such as desks, chairs and holders designed in accordance with the human engineering increase gradually. However, the existing products substantially have the mere function of a display holder.

With the popularity of large-screen displays and multi-screen displays, the existing computer (mobile phone or display) holders or lifting desks (platforms) often are large in size and specification and often have the following disadvantages: the holders can be used only for fixing computers and have not been developed in other functions; for many interfaces, the user needs to bend down to pull or insert them, so it is inconvenient to use; since there is a large difference between the power consumption and the power storage of the existing intelligent products, the intelligent products need to be charged frequently, so that chargers are additionally required by the intelligent products when they are exhibited or used in the connected state and additional space is required for the placement of the chargers; and, when the holders are used at night or matched with special light, a desk lamp, a switch or the like needs to be configured additionally.

SUMMARY

The present disclosure is aimed at solving the above problems. An objective of the present disclosure is to provide a multifunctional holder in order to solve any one of the above problems. Specifically, the present disclosure provides a multifunctional holder which can charge a mobile phone in a wireless manner, can have illumination function, and can be disassembled easily.

According to the first aspect of the present disclosure, the present disclosure provides a multifunctional holder, including a fixation device, a support device and an adjustment device, wherein the fixation device is used for fixing the multifunctional holder on another device; the support device is fixed on the fixation device; the adjustment device is rotatably connected to the support device, the adjustment device is used for mounting a display terminal; the position and angle of the display terminal are controlled by rotation and adjustment of the adjustment device.

A functional portion is provided on the support device; the functional portion includes a wireless charging module, an illumination module and a communication module; the communication module can be electrically coupled to the display terminal, the wireless charging module can be electrically coupled to an intelligent terminal in a wireless manner and charge the intelligent terminal in a wireless manner.

A pedestal is provided on the bottom of the support device, and the wireless charging module is provided on the pedestal.

The adjustment device includes a first arm and a connecting plate; a first end of the first arm is rotatably connected to the top of the support device, the connecting plate is rotatably connected to a second end of the first arm; the display terminal is fixedly connected to the connecting plate.

The first arm is of a four-bar structure, including a first rotating member, a first bar member, a second bar member and a second rotating member; the first rotating member is rotatably coupled to the top of the support device, the second rotating member is rotatably connected to the connecting plate; two ends of the first bar member are hinged to the first rotating member and the second rotating member, respectively, two ends of the second bar member are hinged to the first rotating member and the second rotating member, respectively, and the first bar member and the second bar member are provided in parallel.

The first rotating member includes a first rotation portion and a second rotation portion, and the direction of rotation of the first rotation portion is perpendicular to the direction of rotation of the second rotation portion; the first bar member and the second bar member are hinged to the first rotation portion, the second rotation portion is rotatably coupled to the support device.

The second rotating member includes a third rotation portion and a fourth rotation portion, and the direction of rotation of the third rotation portion is perpendicular to the direction of rotation of the fourth rotation portion; the first bar member and the second bar member are hinged to the third rotation portion, the connecting plate is rotatably connected to the fourth rotation portion.

The adjustment device further includes a second arm; a first end of the second arm is rotatably connected to the top of the support device, a second end of the second arm is rotatably connected to the first end of the first arm.

Positioning holes of at least two specifications are provided on the connecting plate.

The fixation device includes a fixation frame and a fastener; the fixation frame is fixed on the bottom of the support device; the fastener is in transmission connection to the fixation frame.

The fixation frame includes a vertical plate and a support plate; the support plate and the support device are fixed on a same side of the vertical plate, and the support plate is parallel to the bottom of the support device; the fastener is in transmission connection to the support plate.

The multifunctional holder of the present disclosure can realize the multi-angle adjustment of the position of a display terminal and can overcome the charging inconvenience of an intelligent terminal. The multifunctional holder is convenient for use at night or in a special light environment, and has a wide range of application. The multifunctional holder is high in structural integration and easy to use, effectively saves the desktop space, conforms to the human engineering, and greatly improves the user experience.

Other characteristics, features and advantages of the present disclosure will become clearer by reading the following description of exemplary embodiments with reference to the drawings.

BRIEF DESCRIPTION OF THE DRAWING

The drawing incorporated into the description and constituting a part of the description shows the embodiments of the present disclosure, and is used for explaining the principle of the present disclosure in combination with the description. In the drawing, similar reference numerals represent similar elements. The drawing described herein-after shows some but not all of the embodiments of the present disclosure. A person of ordinary skill in the art can obtain other drawings according to the drawing without any creative effort.

FIG. 1 illustratively shows a structural diagram of a multifunctional holder according to the present disclosure.

DETAILED DESCRIPTION OF THE EMBODIMENTS

To make the objectives, technical solutions and advantages of the embodiments of the present disclosure clearer, the technical solutions in the embodiments of the present disclosure will be described in conjunction with the drawing in the embodiments of the present disclosure. Apparently, the described embodiments are some but not all of the embodiments of the present disclosure. All other embodiments obtained by a person of ordinary skill in the art without any creative effort on the basis of the embodiments in the present disclosure shall fall into the scope of the present disclosure. It is to be noted that, the embodiments in the present application and the features in the embodiments can be combined at will so long as there is no conflict.

The multifunctional display holder consistent with the disclosure meets the requirements of controlling a display, improves the utilization of an office space, can charge intelligent terminals such as mobile phones in a wireless manner, can illuminate a part of a target to save energy, and has a wide range of application.

The multifunctional holder of the present disclosure will be described below in detail with reference to the drawing.

FIG. 1 shows a structural diagram of a specific embodiment of the multifunctional holder according to the present disclosure. As shown in FIG. 1, the multifunctional holder 100 includes a fixation device 1, a support device 2 and an adjustment device 3. The fixation device 1 is used for fixing the multifunctional holder 100 on another device. For example, the multifunctional holder can be fixed on an office desktop, a machinery device and the like. The support device 2 is fixed on the fixation device 1, the adjustment device 3 is rotatably connected to the support device 2, and the adjustment device 3 is used for mounting a display terminal. The support device 2 supports the adjustment device 3 and the display terminal mounted on the adjustment device 3, and then preliminarily raises the display terminal to a predetermined height, and the final position, angular orientation and the like of the display terminal are controlled by rotation and adjustment of the adjustment device 3, so that the display terminal can be used in various environments and occasions.

In the multifunctional holder 100 of the present disclosure, a functional portion is provided on the support device 2, to expand the range of application of the holder and meet more usage requirements. For example, in this embodiment, the functional portion includes a wireless charging module 21, an illumination module 22 and a communication module 23. The communication module 23 can be electrically coupled to the display terminal. The information displayed on the display terminal can be transferred to other electronic devices by the communication module 23, or the information in other electronic devices can be transmitted, for displaying, to the display terminal by the communication module 23. The wireless charging module 21 can be electrically coupled to an intelligent terminal in a wireless manner and charge the intelligent terminal in a wireless manner. For example, the intelligent terminal can be an intelligent terminal in use, for example, a mobile phone or a tablet computer. The trouble that the intelligent terminal cannot be charged or is difficulty connected to a power source in the case of low battery level when in use is solved effectively.

Specifically, a pedestal 24 is provided on the bottom of the support device 2, and the wireless charging module 21 is provided on the pedestal 24, The stable support to the charged intelligent terminal can be realized by the pedestal 24. A switch button of the wireless charging module 21 can also be provided on the pedestal to control the turn-on or turn-off of the wireless charging module 21. When the wireless charging module 21 is turned on and when the intelligent terminal is placed on the pedestal 24, the wireless charging module 21 automatically charges the intelligent terminal in default. For example, a pressure sensor for detecting whether the intelligent terminal is placed on the pedestal 24 can be provided on the pedestal 24. If the change in pressure is detected, a matching unit in the wireless charging module 21 automatically searches the intelligent terminal and the identifier information thereof. After the intelligent terminal and the identifier information thereof are found, the matching unit matches the intelligent terminal and thereafter charges the intelligent terminal in default.

The communication module 23 can include a USB socket 231 and an audio interface 232, wherein the USB socket 231 can be used for connecting an external storage device, an external host or other external electronic devices. The audio interface 232 can include a microphone interface, a speaker interface or the like, such that, for example, an earphone, a speaker or another audio device can be externally connected.

The illumination module 22 can include an illumination unit, or can include multiple illumination units distributed at different positions. For example, an LED light for illuminating the keyboard can be provided at a lower position (e.g., on the bottom of the support device 2); or, one or more LED lights used for global illumination or background illumination can also be provided at higher positions (e.g., on the top). A switch button can be independently provided for each illumination unit. In addition, the illumination module 22 may not be provided on the surface of the support device 2, but may be extended to the outside of the support device 2 through a hose, a stiff rod or other connecting members.

In the multifunctional holder 100 of the present disclosure, the adjustment device 3 includes a first arm 31 and a connecting plate 30. A first end of the first arm 31 is rotatably connected to the top of the support device 2, by indirectly rotatably connection and/or directly rotatable connection (indirectly rotatably connection is shown in FIG. 1), so that the first arm 31 can drive the connecting plate 30 to rotate about the support device 2 by 360°; and the connecting plate 30 is rotatably connected to a second end of the first arm 31. The display terminal is fixedly connected to the connecting plate 30. Due to the rotation of the connecting plate 30 and the first arm 31, the display terminal can rotate about the first arm 31 in a left-right direction or an up-down direction, or rotate in any direction of a ball hinge structure.

In a typical embodiment, the first arm 31 is of a four-bar structure, including a first rotating member 311, a first bar member 312, a second bar member 313 and a second rotating member 314. Wherein the first rotating member 311 is rotatably coupled to the top of the support device 2, and the second rotating member 314 is rotatably connected to the connecting plate 30. Two ends of the first bar member 312 are hinged to the first rotating member 311 and the second rotating member 314, respectively; two ends of the second bar member 313 are hinged to the first rotating member 311 and the second rotating member 314, respectively; and the first bar member 312 and the second bar member 313 are provided approximately in parallel. The stable adjustment of the height of the display terminal can be realized by the first arm 31 of the four-bar structure.

As shown in FIG. 1, the first rotating member 311 includes a first rotation portion 311a and a second rotation portion 311b, and the direction of rotation of the first rotation portion 311a is approximately perpendicular to the direction of rotation of the second rotation portion 311b; the first bar member 312 and the second bar member 313 are hinged to the first rotation portion 311a, the second rotation portion 311b is rotatably coupled to the support device 2. The second rotation portion 311b can make the first arm 31 rotate about the support device 2 in a horizontal plane at a certain height to realize position adjustment, the first rotation portion 311a can make the first arm 31 swing up and down along with the hinged rotation of the first bar member 312 and the second bar member 313 so as to adjust the height of the display terminal.

Correspondingly, the second rotating member 314 includes a third rotation portion 314a and a fourth rotation portion 314b, and the direction of rotation of the third rotation portion 314a is approximately perpendicular to the direction of rotation of the fourth rotation portion 314b; the first bar member 312 and the second bar member 313 are hinged to the third rotation portion 314a, the connecting plate 30 is rotatably connected to the fourth rotation portion 314b. The third rotation portion 314a can enable the connecting plate 30 to drive the up-and-down rotation of the angle of the display terminal in the vertical direction, the fourth rotation portion 314b can enable the connecting plate 30 to drive the left-and-right rotation of the angle of the display terminal in the horizontal direction. In addition, the connecting plate 30 can also be hinged to the fourth rotation portion 314b, that is, the connecting plate 30 can rotate up and down about the second rotating member 314 and then rotate left and right by the fourth rotation portion 314b. Further, the angle of the up-and-down rotation of the connecting plate can be expanded by the third rotation portion 314b.

By providing the first rotating member 311 and the second rotating member 314 which can be rotated in two directions, the adjustment of the position of the connecting plate 30 within a range of 360° in the horizontal plane and within a range greater than or equal to 180° in the vertical plane and the upward rotation adjustment of the connecting plate at a certain position by above 180° in the left-right direction and the up-down direction can be realized effectively, so that the content to be displayed can be displayed in all orientations.

In this embodiment, the adjustment device 3 further includes a second arm 32. A first end of the second arm 32 is rotatably connected to the top of the support device 2, a second end of the second arm 32 is rotatably connected to the first end of the first arm 31. As shown in FIG. 1, the second arm 32 supports the first arm 31 away from the support device 2 in the horizontal direction; and, the first arm 31 can rotate about the second arm 32 by 360°, and the second arm 32 can rotate about the support device 2 by 360°. Accordingly, the display distance of the display terminal is further expanded.

In a typical embodiment, the adjustment device 3 can include multiple second arms 32 which are rotatably connected successively, so that the interval of the rotation of the first arm 31 about the support device 2 is further expanded, and the adaptive adjustment can be realized by the rotation and folding of the multiple second arms 32.

In another typical embodiment, multiple adjustment devices 3 can be rotatably connected to the top of the support device 2, that is, multiple first arms 31 are rotatably connected to the top of the support device 2. Each first arm 31 can be directly connected to the top of the support device 2, or can be hinged to the top of the support device 2 via one second arm 32; and, each first arm 31 can be connected to one display terminal, so that multiple display terminals can simultaneously display the same content at multiple angles and at multiple positions, or simultaneously display different contents in a same direction or in different directions.

Specifically, positioning holes 301 of at least two specifications are provided on the connecting plate 30 in order to adapt to display terminals of different installation specifications. For example, four round holes or slot holes in 75×75 mm and 100×100 mm can be provided on the connecting plate; or, at least four positioning holes 301 can be distributed in form of a rectangle in a certain ratio, or positioning holes of multiple specifications are provided in the direction of a tip of an equilateral triangle.

In addition, connecting plates of different shapes and structures can be provided on a same multifunctional holder 100 in order to adapt to different notebook computers, displays or the like.

Since the adjustment device 3 of the multifunctional holder 100 has a varied structure and a wide range of position and angle adjustment, generally, the adjustment device can be fixed at a distal end of a desktop, a platform or a device by the fixation device 1, so that the effective space of the desktop or platform is further expanded. The fixation device 1 generally includes a fixation frame 11 and a fastener 12. The fixation frame 11 is fixed on the bottom of the support device 2, the fastener 12 is in transmission connection to the fixation frame 11. The fixation frame 11 is used for preliminarily limiting the multifunctional holder 100 on the device to be mounted, then the position is locked and fixed by the fastener 12.

Specifically, the fixation frame 11 includes a vertical plate 111 and a support plate 112. The support plate 112 and the support device 2 are fixed on a same side of the vertical plate 111, and the support plate 112 is approximately parallel to the bottom of the support device 2. The fastener 12 is in transmission connection to the vertical plate 111. The vertical plate 111 is mainly used for limiting the mounting position of the multifunctional holder 100, and the support plate 112 is used for limiting and supporting the fastener 12.

In this embodiment, in order to firmly mount the multifunctional holder 100, a locking section of the fastener 12 is of a planar structure to ensure the firm contact with the bottom of the platform or other devices to the largest extent.

In addition, at least one wiring closet is provided on a side wall of the support device 2 and a side wall of the adjustment device 3, and the wiring closet is covered by a wiring cover, so that the external wires of the terminal are fixed and protected.

The contents described above can be implemented independently or jointly in various ways, and these transformations shall fall into the protection scope of the present disclosure.

It is to be noted that, as used herein, the relational terms such as "first" and "second" are merely used for distinguishing one entity or operation from another entity or operation, but do not necessarily require or imply any actual relationship or order between entities or operations. Moreover, the term "comprise/comprising," "contain/containing" or any other variants thereof is non-exclusive, so that a process, method, object or device containing a series of elements contains not only these elements, but also other elements not listed clearly, or further contains inherent elements of the process, method, object or device. Without more restrictions, an element defined by the statement "comprises an/a . . . " does not exclude other identical elements in the process, method, object or device including this element.

Finally, it is to be noted that the foregoing embodiments are merely used for describing the technical solutions of the present disclosure and not intended to limit the technical solutions of the present disclosure. Although the present disclosure has been described in detail with the foregoing embodiments, it should be understood by a person of ordinary skill in the art that modifications still can be made to the technical solutions described in the foregoing embodiments or equivalent replacements can be made to part of technical features, and these modifications or replacements will not make the essence of the corresponding technical solutions depart from the spirit and scope of the technical solutions in the embodiments of the present disclosure.

What is claimed is:

1. A multifunctional holder comprising:
    a fixation device configured to fix the multifunctional holder on another device;
    a support device fixed on the fixation device and including:
        a pedestal provided at a bottom of the support device;
        a pressure sensor provided on the pedestal and configured to detect whether an intelligent terminal is placed on the pedestal;
        a wireless charging module provided on the pedestal and configured to charge the intelligent terminal in a wireless manner in response to the pressure sensor detecting a change in pressure indicating that the intelligent terminal is placed on the pedestal;
        an illumination module configured to illuminate at least a nearby area of the multifunctional holder; and
        a communication module configured to receive or transmit information from or to the display terminal; and
    an adjustment device rotatably connected to the support device and configured to mount a display terminal, a position and an angle of the display terminal being controlled by a rotation and an adjustment of the adjustment device.

2. The multifunctional holder according to claim 1, wherein:
    the pedestal being configured to work together with the fixation device to fix the multifunctional holder on the another device.

3. The multifunctional holder according to claim 1, wherein the adjustment device includes:
    an arm, a first end of the arm being rotatably coupled to a top of the support device; and
    a connecting plate rotatably connected to a second end of the arm, the connecting plate being configured to be fixedly connected to the display terminal.

4. The multifunctional holder according to claim 3, wherein the arm has a four-bar structure and includes:
    a first rotating member rotatably coupled to the top of the support device;
    a second rotating member rotatably connected to the connecting plate;
    a first bar member, two ends of the first bar member being hinged to the first rotating member and the second rotating member, respectively; and
    a second bar member, two ends of the second bar member being hinged to the first rotating member and the second rotating member, respectively, and the second bar member being approximately parallel to the first bar member.

5. The multifunctional holder according to claim 4, wherein:
    the first rotating member includes a first rotation portion and a second rotation portion, a direction of rotation of the first rotation portion being approximately perpendicular to a direction of rotation of the second rotation portion, the first bar member and the second bar member being hinged to the first rotation portion, and the second rotation portion being rotatably coupled to the support device;
    the second rotating member includes a third rotation portion and a fourth rotation portion, a direction of rotation of the third rotation portion being approximately perpendicular to a direction of rotation of the fourth rotation portion, the first bar member and the second bar member being hinged to the third rotation portion, and the connecting plate being rotatably connected to the fourth rotation portion.

6. The multifunctional holder according to claim 3, wherein:
    the arm is a first arm; and
    the adjustment device further includes a second arm, a first end of the second arm being rotatably connected to the top of the support device, and a second end of the second arm being rotatably connected to the first end of the first arm.

7. The multifunctional holder according to claim 3, wherein the connecting plate includes positioning holes of at least two specifications.

8. The multifunctional holder according to claim 1, wherein the fixation device includes:
    a fixation frame fixed on a bottom of the support device; and
    a fastener in transmission connection with the fixation frame.

9. The multifunctional holder according to claim 8, wherein:
    the fixation frame includes:
        a vertical plate; and
        a support plate approximately parallel to the bottom of the support device;
    the support plate and the support device are fixed on a same side of the vertical plate; and
    the fastener is in transmission connection with the support plate.

10. The multifunctional holder according to claim 1, wherein:
    the wireless charging module includes a matching unit configured to search for the intelligent terminal and identifier information of the intelligent terminal; and
    the wireless charging module is further configured to charge the intelligent terminal in response to the matching unit finding the intelligent terminal and the identifier information of the intelligent terminal.

11. The multifunctional holder according to claim 1, wherein the illumination module includes:
    an LED light provided on a bottom of the support device; and
    one or more LED lights provided on a top of the support device and configured for global illumination or background illumination.

12. The multifunctional holder according to claim 1, further comprising:
    an extending member coupled to the support device;

wherein the illumination module is provided at the extending member and extends to outside of the support device.

* * * * *